United States Patent
Milne et al.

(10) Patent No.: US 11,157,236 B2
(45) Date of Patent: Oct. 26, 2021

(54) ROOM CORRECTION BASED ON OCCUPANCY DETERMINATION

(71) Applicant: SONY CORPORATION, Tokyo (JP)

(72) Inventors: James R. Milne, San Diego, CA (US); Allison Joi Burgueno, San Diego, CA (US); Gregory Carlsson, San Diego, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/890,047

(22) Filed: Jun. 2, 2020

(65) Prior Publication Data
US 2021/0089263 A1  Mar. 25, 2021

Related U.S. Application Data

(60) Provisional application No. 62/903,147, filed on Sep. 20, 2019.

(51) Int. Cl.
*G06F 17/00* (2019.01)
*G06F 3/16* (2006.01)
*H04R 3/04* (2006.01)

(52) U.S. Cl.
CPC .............. *G06F 3/165* (2013.01); *H04R 3/04* (2013.01)

(58) Field of Classification Search
CPC .................................. G06F 3/165; H04R 3/04
See application file for complete search history.

(56) References Cited

U.S. PATENT DOCUMENTS

| 2003/0091069 A1* | 5/2003 | Kraemer | H04B 1/20 370/487 |
| 2005/0105744 A1* | 5/2005 | Lee | H04S 7/302 381/86 |
| 2006/0002571 A1* | 1/2006 | Holloway | H04R 5/02 381/104 |
| 2014/0112480 A1* | 4/2014 | Audfray | H04S 7/303 381/17 |

(Continued)

FOREIGN PATENT DOCUMENTS

| WO | 2009/090600 A1 | 7/2009 |
| WO | 2015/026859 A1 | 2/2015 |

(Continued)

*Primary Examiner* — Joseph Saunders, Jr.
(74) *Attorney, Agent, or Firm* — Chip Law Group

(57) ABSTRACT

An audio reproduction device and method for room correction based on occupancy determination is provided. The audio reproduction device includes a speaker which reproduces audio, and includes a memory which stores a plurality of room-correction (RC) presets. The audio reproduction of the speaker is controlled within an enclosed physical space based on each of the plurality of RC presets. The audio reproduction device receives an occupancy signal from at least one sensor communicatively coupled with the audio reproduction device. The audio reproduction device further determines a number of people of a set of people, present in the enclosed physical space, based on the received occupancy signal. The audio reproduction device retrieves first room-correction (RC) preset from the stored plurality of RC presets based on the determined number of people. The audio reproduction device further controls the audio reproduction of the speaker based on the retrieved first RC preset.

17 Claims, 7 Drawing Sheets

(56) References Cited

U.S. PATENT DOCUMENTS

2014/0133672 A1* 5/2014 Lakkundi .............. H04R 3/12
                                                      381/80
2020/0252738 A1* 8/2020 Welti .................... H04R 1/02

FOREIGN PATENT DOCUMENTS

| WO | WO-2015026859 A1 * | 2/2015 | ........... G06F 1/1632 |
| WO | 2016/137890 A1 | 9/2016 | |

* cited by examiner

ROOM CORRECTION BASED ON OCCUPANCY DETERMINATION

CROSS-REFERENCE TO RELATED APPLICATIONS/INCORPORATION BY REFERENCE

This application claims priority to U.S. Provisional Patent Application Ser. No. 62/903,147 filed on Sep. 20, 2019, the entire content of which is hereby incorporated herein by reference.

FIELD

Various embodiments of the disclosure relate to audio reproduction devices. More specifically, various embodiments of the disclosure relate to control of audio reproduction devices to provide room correction based on occupancy determination.

BACKGROUND

Recent advancements in the field of audio reproduction devices (such as, televisions or speakers) have led to development of various technologies and systems to enhance reproduction of audio content. Typically, when an audio reproduction device located within an enclosed physical space (such as, a room or a cinema hall) reproduces the audio content, a listener (such as, a person who may be present within the enclosed physical space) may hear sound associated with different frequency responses for the same reproduced audio content. This variation of the frequency responses may be due to various factors, such as, a distance of the listener from the audio reproduction device, an absorption and/or a reflection of the sound due to the surrounding environment (such as, furniture, curtain, and walls) of the enclosed physical space.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An audio reproduction device and method for control of the audio reproduction device for room correction based on occupancy determination is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed audio reproduction device and method for room correction based on occupancy determination. Exemplary aspects of the disclosure provide an audio reproduction device (for example, a television (TV), a sound bar, an audio video receivers (AVRs)) which may control audio reproduction of an in-built speaker (for example, a loudspeaker, a woofer, and the like) in an enclosed physical space (for example, a room, a hall, and the like). The audio reproduction device may be configured to detect a number of people present in the enclosed physical space based on signals received from at least one sensor (for example, an Infra-red sensor, an image capturing device, a motion sensor, an occupancy sensor, and the like) communicatively coupled to the audio reproduction device. The detection may allow the audio reproduction device to dynamically determine the number of people or an occupancy of the enclosed physical space. Further, the audio reproduction device may be configured to store a plurality of room-correction (RC) presets in order to provide a dynamic control of room correction in the enclosed physical space. The plurality of RC presets may be pre-calibrated to provide the room correction in the enclosed physical space. In an embodiment, each of the plurality of RC presets may include, but is not limited to, information about an amplitude or a gain level of a particular frequency, information about amplification or attenuation corresponding to the particular frequency, information about a frequency range, a center frequency value, a quality factor (Q), bandwidth information, one or more filter coefficients, or delay information, to control the audio reproduction of the speaker, and dynamically provide room correction in the enclosed physical space based on the number of people.

The audio reproduction device may be further configured to retrieve a first RC preset or a second RC preset from the stored plurality of RC presets based on the determined number of the people as one or two, respectively, in the enclosed physical space. The audio reproduction device may be further configured to control the audio reproduction of the speaker based on the retrieved first RC preset or the second RC preset. Therefore, the disclosed audio reproduction device achieves dynamic control of the room correction in the enclosed physical space based on the determined occupancy and already stored RC presets for the enclosed physical space, thereby further enhance listening experience for the people present in the enclosed physical space in a real time.

Figure 1:
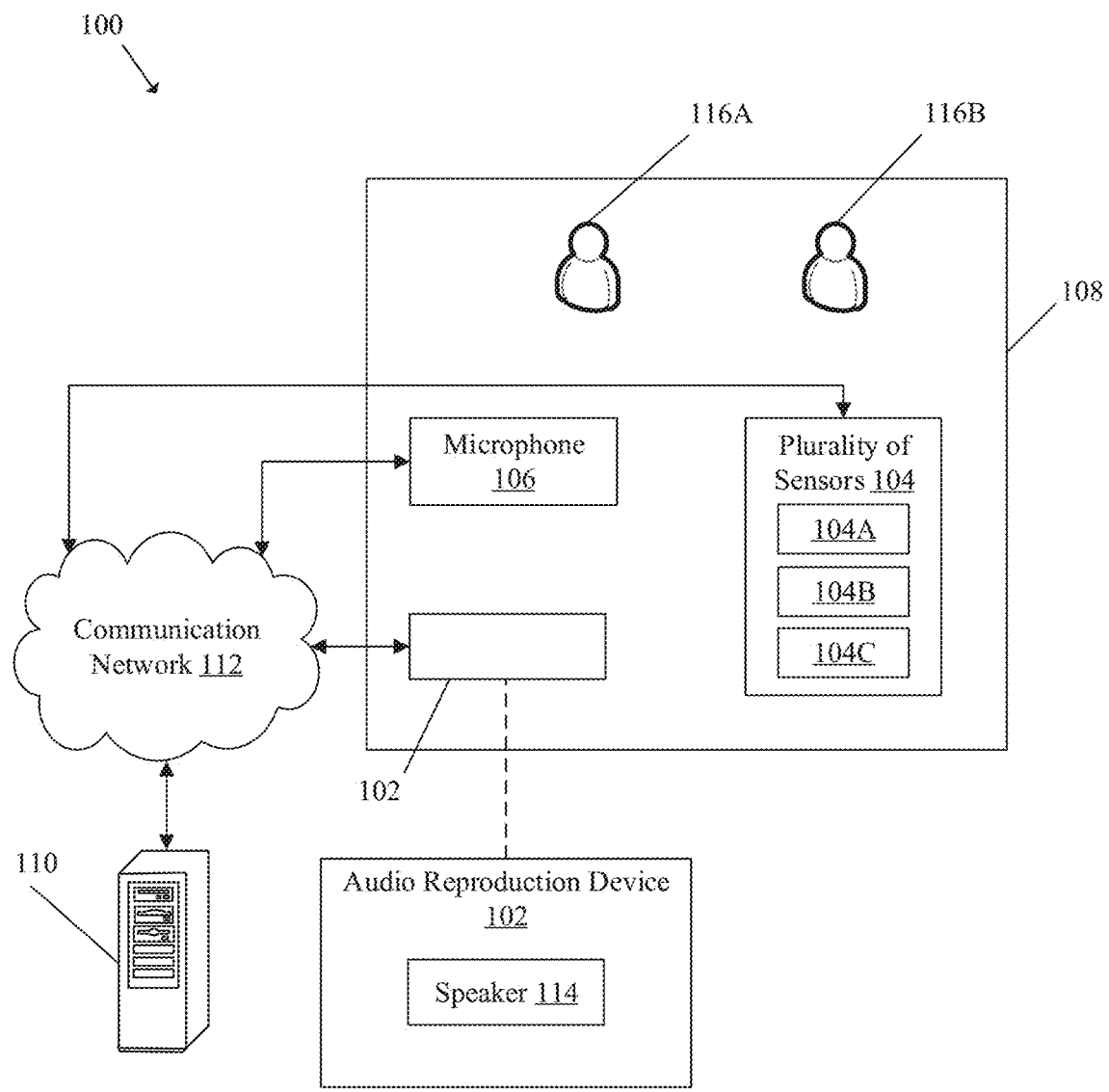
FIG. 1 is a block diagram that illustrates an exemplary network environment for control of an audio reproduction device for room correction based on occupancy determination, in accordance with an embodiment of the disclosure.

FIG. 1 is a block diagram that illustrates an exemplary network environment for control of an audio reproduction device for room correction based on occupancy determination, in accordance with an embodiment of the disclosure. With reference to FIG. 1, there is shown a diagram of a network environment 100. The network environment 100 may include an audio reproduction device 102, a plurality of sensors 104, and a microphone 106 located within an enclosed physical space 108, and a server 110. The audio reproduction device 102, the plurality of sensors 104, the microphone 106, and the server 110 may be communicatively coupled with each other, via a communication network 112. Further, the audio reproduction device 102 may include a speaker 114 configured to reproduce audio. In the network environment 100, there is shown a plurality of users 116A-116B who may be associated with the audio reproduction device 102. As shown in FIG. 1, the audio reproduction device 102, the plurality of sensors 104, the microphone 106, and the plurality of users 116A-116B (as listeners) may be present within the enclosed physical space 108. In FIG. 1, the plurality of sensors 104 and the audio reproduction device 102 are shown as separate devices; however, in some embodiments, the entire functionality of the plurality of sensors 104 may be included in the audio reproduction device 102, without a deviation from scope of the disclosure.

The audio reproduction device 102 may include suitable logic, circuitry, and/or interfaces that may be configured to control the audio reproduction of the speaker 114. The audio reproduction device 102 may be configured to receive an occupancy signal from at least one sensor (such as the plurality of sensors 104). Based on the received occupancy signal, the audio reproduction device 102 may be configured to determine a number of people of a set of people (i.e. the plurality of users 116A-116B) present in the enclosed physical space 108. The audio reproduction device 102 may be further configured control the audio reproduction of the speaker 114 to perform room correction based on the determined number of people. Examples of the audio reproduction device 102 may include, but are not limited to, a television (TV), an audio video receivers (AVRs), a soundbar, a sound system, a home theater system, radio receivers, a tape recorder with audio reproduction capability, an audio mixing console, a loudspeaker, or other audio reproduction device.

The plurality of sensors 104 may include suitable logic, circuitry, code, and/or interfaces that may be configured to generate an occupancy signal in order to determine an occupancy of people within the enclosed physical space. The plurality of sensors 104 may be further configured to transmit the occupancy signal to the audio reproduction device 102. Examples of the plurality of sensors 104 may include, but are not limited to, an Infra-red sensor, an image capturing device, a radio-frequency identification (RFID) sensor, a motion sensor, a proximity sensor, a temperature sensor, an occupancy sensor, an ultrasonic sensor, or a microwave sensor. The plurality of sensors 104 are described, for example, in FIG. 3A.

In the network environment 100, there are shown three sensors of the plurality of sensors such as a first sensor 104A, a second sensor 104B and a third sensor 104C. For example, the first sensor 104A may be the infra-red sensor, the second sensor 104B may be the image capture device, and the third sensor 104C may be the RFID sensor. The infra-red sensor may include suitable logic, circuitry, and/or interfaces that may be configured to detect infrared radiations in the enclosed physical space 108 in order to generate and transmit the occupancy signal to the audio reproduction device 102. For example, the Infrared sensor may be used to detect the presence of people (as the occupancy signal) in the enclosed physical space 108. The image capture device may be configured to capture an image of the enclosed physical space 108. The image capture device may be further configured to determine occupancy of the enclosed physical space 108 based on the captured image, and generate the occupancy signal based on the determined occupancy. Examples of the image capture device may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. The RFID sensor may be configured to detect the number of people (such as the plurality of users 116A-116B) in the enclosed physical space 108 using radio frequency signals and generate the occupancy signal based on the detected number (i.e. occupancy). A description of other sensors has been omitted from the disclosure for the sake of brevity. It may be noted that the first sensor 104A, the second sensor 104B and the third sensor 104C shown in FIG. 1 are presented merely as an example. The plurality of sensors 104 may include only one sensor or more than one sensor to detect the occupancy of the enclosed physical space, without any deviation from the scope of the disclosure.

The microphone 106 may include suitable logic, circuitry, code and/or interfaces that may be configured to capture the audio reproduced from the speaker 114. The microphone 106 may further generate a frequency response of the captured audio. In an embodiment, the frequency response of the audio captured by the microphone 106 may be different from a frequency response of the audio reproduced by the speaker due to certain factors (such as sound reflections or absorption done by objects or walls of the enclosed physical space 108). Examples of the microphone 106 may include, but are not limited to, a recorder, an electret microphone, a dynamic microphone, a carbon microphone, a piezoelectric microphone, a fiber microphone, a micro-electro-mechanical-systems (MEMS) microphone, or other microphones.

In the network environment 100, there is shown that the audio reproduction device 102, the plurality of sensors 104, and the microphone 106 may be located within the enclosed physical space 108. The enclosed physical space 108 may be a three-dimensional physical area that may be surrounded by walls and roofs, and/or may have a defined physical dimension in a physical environment. Examples of the enclosed physical space 108 may include, but are not limited to, a room, a hall, a theatre, or other enclosed areas.

The speaker 114 may include suitable logic, circuitry, and/or interfaces that may be configured to reproduce the audio associated with audio content (for example a song, a test tone, or a musical tone) stored in the audio reproduction device 102. The speaker 114 may be configured to receive electrical signals or instructions (i.e. related to the audio content) from the audio reproduction device 102, and convert the received electrical signals or instructions into an audio output. In some embodiments, the speaker 114 may be integrated with the audio reproduction device 102. The speaker 114 may be an internal component of the audio reproduction device 102 and the entire functionality of speaker 114 may be included in the audio reproduction device 102. In some embodiments, the speaker 114 may be communicatively coupled with the audio reproduction device 102 and is positioned within the enclosed physical space 108. Examples of the speaker 114 may include, but are not limited to, an external wireless speaker, an internal speaker, an external wired speaker, a woofer, a sub-woofer, a tweeter, a loudspeaker, a monitor speaker, an optical audio device, or sound output device that may be communicatively coupled to the audio reproduction device 102 through the communication network 112 or integrated in the audio reproduction device 102.

The server 110 may include suitable logic, circuitry, code, and/or interfaces that may be configured to transmit the audio content to the audio reproduction device 102. The server 110 may be further configured to store the audio content. In some embodiments, the server 110 may be configured to store the plurality of RC presets and provide the stored plurality of RC presets to the audio reproduction device 102 to perform the room correction based on the determined occupancy in the enclosed physical space 108. The server 110 may be implemented as a cloud server and may execute operations through web applications, cloud applications, HTTP requests, repository operations, file transfer, and the like. Other example implementations of the server 110 may include, but are not limited to, a database server, a file server, a web server, a media server, an application server, a mainframe server, or a cloud computing server.

The communication network 112 may include a communication medium through which the audio reproduction device 102, the plurality of sensors 104, the microphone 106, and the server 110 may communicate with each other. The communication network 112 may be one of a wired connection or a wireless connection Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the audio reproduction device 102 may be configured to receive a user input, for example, to turn-on the audio reproduction device 102, which may further allow the audio reproduction device 102 to dynamically control the room correction based on occupancy determination. The audio reproduction device 102 may be configured to receive an occupancy signal from at least one sensor (such as the plurality of sensors 104) communicatively coupled with the audio reproduction device 102. The occupancy signal may refer to an electrical or digital signal transmitted from one of the plurality of sensors 104 to the audio reproduction device 102, via the communication network 112. The occupancy signal may indicate a number of people (such as the users 116A-116B) present in the enclosed physical space 108. In an embodiment, the plurality of sensors 104 may be located within the enclosed physical space 108. In another embodiment, one or more of the plurality of sensors 104 may be included in the audio reproduction device 102, for example a camera. In such a case, the entire functionality of the one or more of the plurality of sensors 104 may be included in the audio reproduction device 102, without a deviation from scope of the disclosure.

In accordance with an embodiment, based on the received occupancy signal, the audio reproduction device 102 may be configured to determine the number of people of the set of the people present in the enclosed physical space 108. The determination of the occupancy (i.e. number of the people) of the enclosed physical space 108 based on the occupancy signal provided by the plurality of sensors 104 is described, for example, in FIG. 3A. The audio reproduction device 102 may be configured to retrieve a first room correct (RC) preset from the stored plurality of RC presets based on the determined number of people (such as the users 116A-116B). Each of the plurality of RC presets may be pre-calibrated information to control the audio reproduction of the speaker 114 to perform the room correction within the enclosed physical space 108 based on the detected number of people. The plurality of RC presets are described, for example, in FIG. 3A.

The audio reproduction device 102 may be further configured to control the audio reproduction of the speaker 114 based on the retrieved first RC preset determined based on the detected number of people in the enclosed physical space 108. Thus, the disclosed audio reproduction device 102 may provide automatic control for the room correction in the enclosed physical space 108 based on the determined number of people present in the enclosed physical space 108. This may further allow the audio reproduction device 102 to maintain and/or enhance the listening experience of each person present in the enclosed physical space, such that each person may hear an optimum audio reproduced by the speaker 114.

Figure 2:
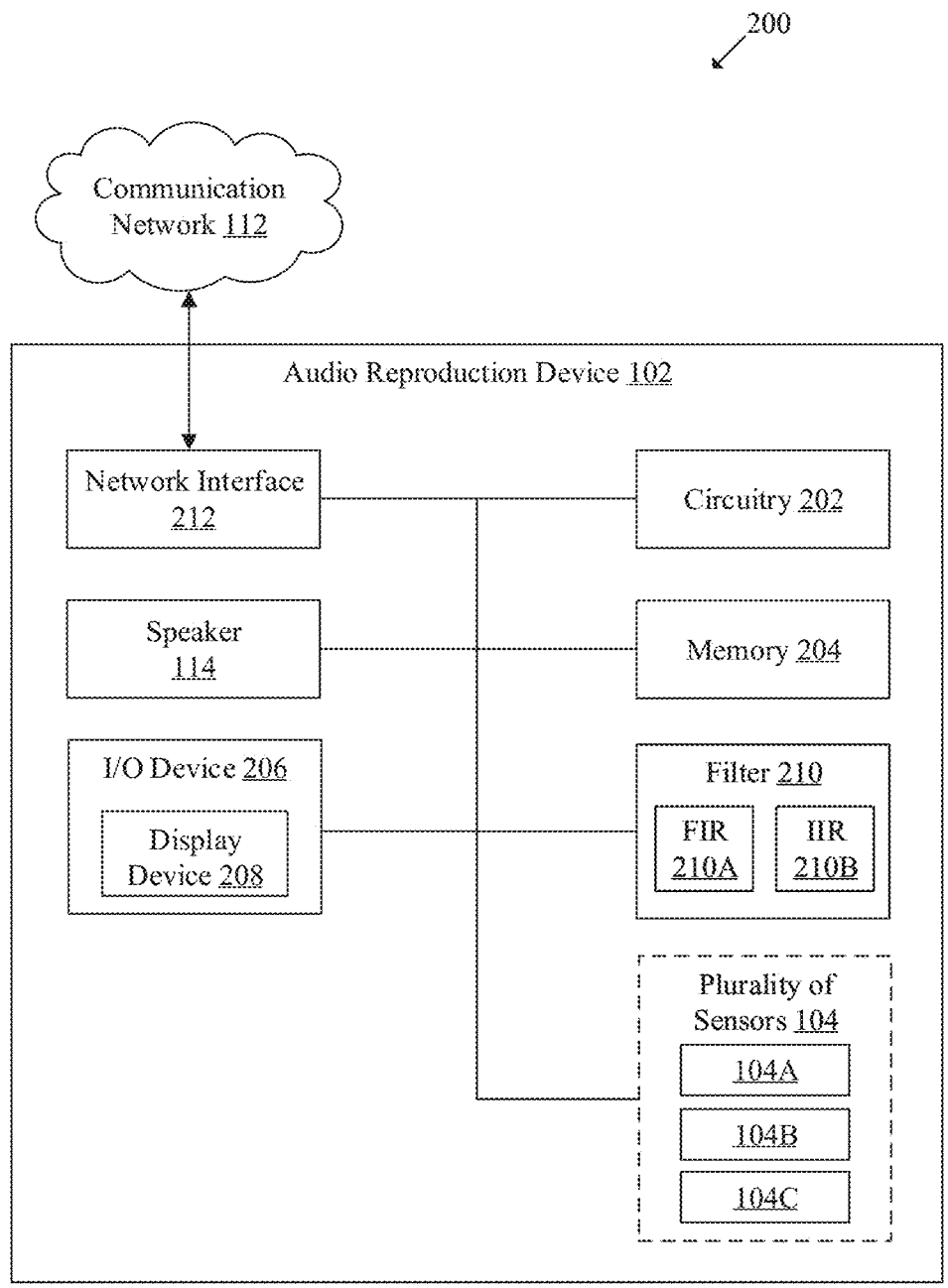
FIG. 2 is a block diagram that illustrates an exemplary audio reproduction device of FIG. 1, in accordance with an embodiment of the disclosure.

FIG. 2 is a block diagram that illustrates an exemplary audio reproduction device of FIG. 1, in accordance with an embodiment of the disclosure. FIG. 2 is explained in conjunction with elements from FIG. 1. With reference to FIG. 2, there is shown a block diagram 200 of the audio reproduction device 102. The audio reproduction device 102 may include a circuitry 202. The audio reproduction device 102 may further include a memory 204 and the speaker 114. Further, the audio reproduction device 102 may include an input/output (I/O) device 206 that may include a display device 208. The audio reproduction device 102 may further include a filter 210 that may include a finite impulse response (FIR) filter 210A and an infinite impulse response (IIR) filter 210B. Further, the audio reproduction device 102 may include a network interface 212, through which the audio reproduction device 102 may be connected to the communication network 112. As shown in FIG. 2A, the audio reproduction device 102 may include one or more of the plurality of sensors 104.

The circuitry 202 may include suitable logic, circuitry, interfaces, and/or code that may be configured to execute program instructions associated with different operations to be executed by the audio reproduction device 102. For example, some of the operations may include reception of the occupancy signal from the plurality of sensors 104, determination of the number of people of the set of people present in the enclosed physical space 108, retrieval of the first RC preset from the stored plurality of RC presets, and control the audio reproduction of the speaker 114. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store the plurality of RC presets. The memory 204 may be further configured to store an association between the plurality of RC presets and the number of people of the set of people present in the enclosed physical space 108. For example, a particular RC preset (e.g., a first RC preset) of the stored plurality of the RC presets may be associated with a particular number of people (e.g., one person) present in the enclosed physical space 108. The memory 204 may store the association (or correlation) between the plurality of RC presets and the number of people as a look-up table (for example Table 1 described with FIG. 3A). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input and provide an output based on the received input. The I/O device 206 may include various input and output devices, which may be configured to communicate with the circuitry 202. For example, the audio reproduction device 102 may receive the user input to initiate audio reproduction or select the plurality of RC presets, via the I/O device 206. Examples of the I/O device 206 may include, but are not limited to, a touch screen, a keyboard, a mouse, a joystick, a display device (for example, the display device 208), a microphone, or a speaker (for example, the speaker 114).

The display device 208 may comprise suitable logic, circuitry, and interfaces that may be configured to display an output of the audio reproduction device 102. The display device 208 may be utilized to display the stored plurality of RC presets. In some embodiments, the display device 208 may be an external display device associated with the audio reproduction device 102. The display device 208 may be a touch screen which may enable the user (such as the users 116A-116B) to provide a user-input, via the display device 208, in order to select the first RC preset from the stored plurality of RC preset. The touch screen may be at least one of a resistive touch screen, a capacitive touch screen, a thermal touch screen or any other touch screen using which inputs can be provided to the display device 208 or the circuitry 202. The display device 208 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208 may refer to a display screen of a head mounted device (HMD), a smart-glass device, a see-through display, a projection-based display, an electro-chromic display, or a transparent display.

The filter 210 may include suitable logic, circuitry, interfaces, and/or code that may be configured to amplify, pass or attenuate some frequency responses of an audio signal. The circuitry 202 may be further configured to determine filter coefficients based on a type of the filter. Examples of the filter 210 may include, but are not limited to, the finite impulse response (FIR) 210A, the infinite impulse response (IIR) 210B, low pass filter, a high pass filter, band pass filter, a band reject filter, comb filter, impulse filter or any other audio filter. The FIR filter 210A may be a filter which may provide an impulse response for a finite duration. Examples of the FIR filter 210A may include, but are not limited to, boxcar filter, a hilbert transform filter, a differentiator, a Lth-band filter, or raised-cosine filter. The IIR filter 210B may be a filter which may provide impulse response for an infinite duration. Examples of the IIR filter 210B may include, but are not limited to, a Chebyshev filter, a butterworth filter, or an elliptic filter. The circuitry 202 may be further configured to determine FIR filter coefficients and IIR filter coefficients for the FIR filter 210A and the IIR filter 210B, respectively included in the stored plurality of RC presets.

The network interface 212 may comprise suitable logic, circuitry, interfaces, and/or code that may be configured to facilitate communication between the audio reproduction device 102, the plurality of sensors 104, the microphone 106, and the server 110, via the communication network 112. The network interface 212 may be implemented by use of various known technologies to support wired or wireless communication of the audio reproduction device 102 with the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 212 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the audio reproduction device 102 in FIG. 2 may also include other suitable components or systems, in addition to the components or systems which are illustrated herein to describe and explain the function and operation of the present disclosure. A detailed description for the other components or systems of the audio reproduction device 102 has been omitted from the disclosure for the sake of brevity. The operations of the circuitry 202 are further described, for example, in FIGS. 3A and 3B.

Figure 3A:
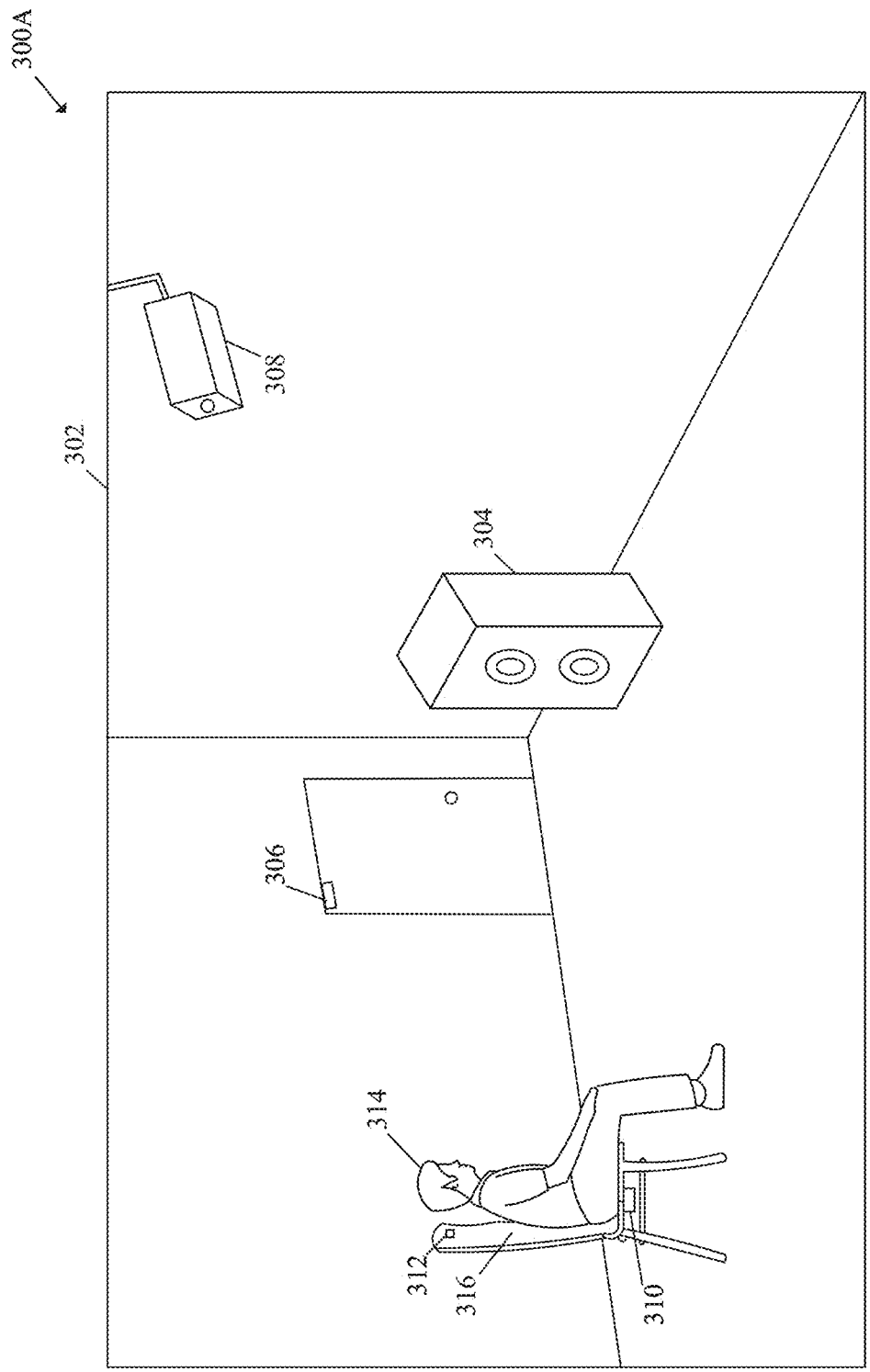
FIGS. 3A and 3B are diagrams that illustrate exemplary scenarios for control of the audio reproduction device of FIG. 2, for room correction based on occupancy determination, in accordance with an embodiment of the disclosure.
Figure 3B:
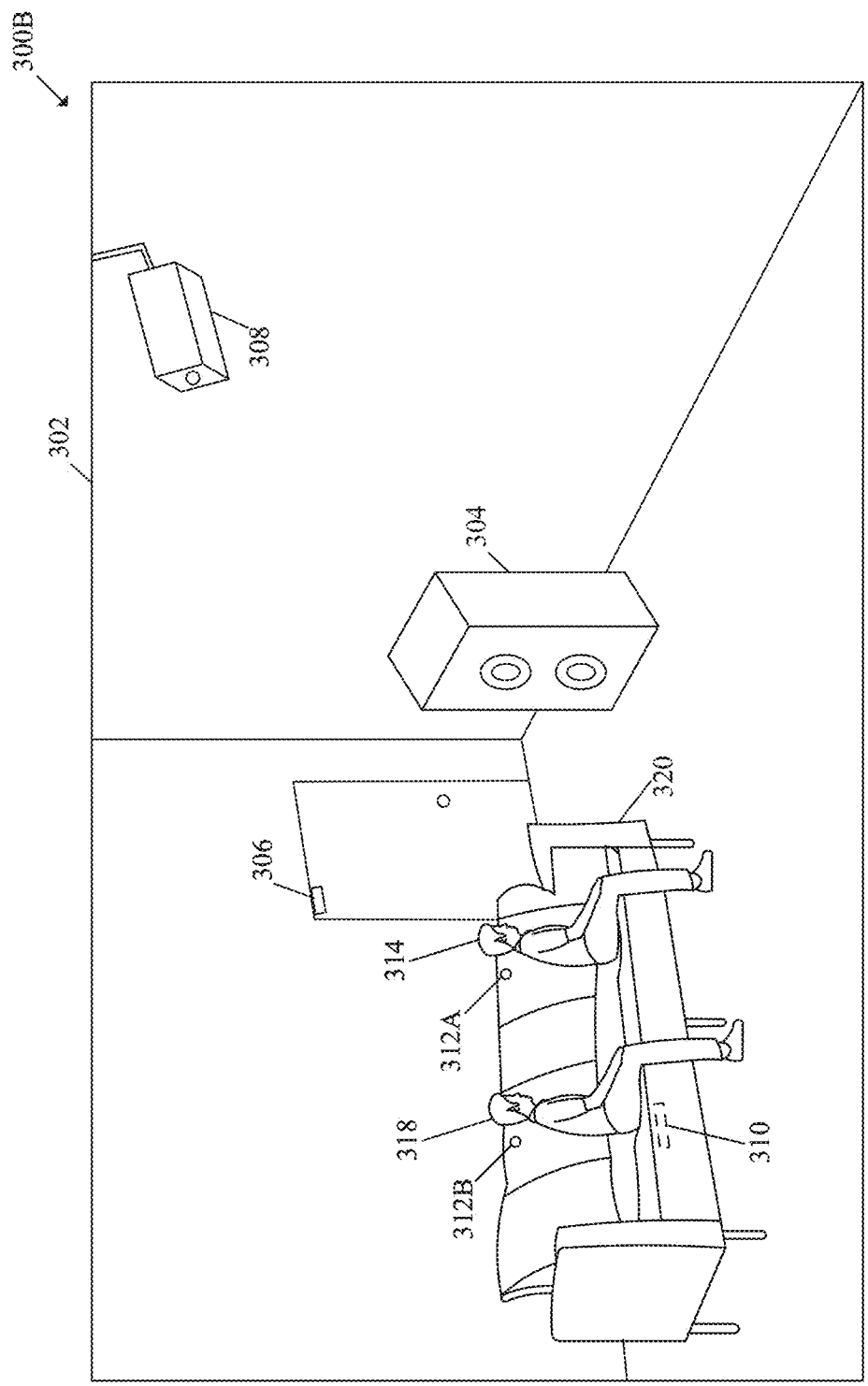

FIGS. 3A and 3B are diagrams that illustrate exemplary scenarios for control of the audio reproduction device of FIG. 2, for room correction based on occupancy determination, in accordance with an embodiment of the disclosure. FIGS. 3A and 3B are explained in conjunction with elements from FIGS. 1 and 2. With reference to FIG. 3A, there is shown an exemplary scenario 300. In the exemplary scenario 300A, there is shown a room 302 as an exemplary implementation of the enclosed physical space 108 of FIG. 1. There is further shown a speaker 304, which may include an exemplary implementation of the speaker 114 of FIG. 1. There is further shown a motion sensor 306, an image capturing device 308, and an occupancy sensor 310 which may include an exemplary implementation of the plurality of sensors 104. There is further shown a microphone 312 which may include an exemplary implementation of the microphone 106. Therefore, the descriptions of the room 302, the speaker 304, the plurality of sensors 104, and the microphone 312 are omitted from the disclosure for the sake of brevity. In the scenario 300A, there is further shown a first user 314. In an embodiment, the first user 314 may be sitting on a chair 316 in proximity to the speaker 304 located within the room 302. It may be noted that the motion sensor 306, the image capture device 308, and the occupancy sensor 310 shown as the plurality of sensors 104 in FIG. 3A is merely an example. The scenario 300A may include other types of the plurality of sensors 104, without any deviation from the scope of the disclosure.

The circuitry 202 may be configured to control the speaker 304 to reproduce audio and perform room correction based on occupancy determination. The circuitry 202 may be further configured to receive the occupancy signal from the motion sensor 306, the image capture device 308, or the occupancy sensor 310 present in the room 302. The circuitry 202 may be configured to receive the occupancy signal in the form an electrical or digital signal from the plurality of sensors (i.e. for example, the motion sensor 306, image capture device 308, or the occupancy sensor 310).

The motion sensor 306 may include suitable logic, circuitry, and/or interfaces that may be configured to detect a presence of people (such as the first user 314) in the room 302. For example, when the first user 314 moves inside the room 302, the motion sensor 306 may be configured to detect the presence or the movement of the first user 314 in the room 302 (i.e. enclosed physical space 108). As per FIG. 3A, for example, the motion sensor 306 may be located near an entry door of the room 302 to detect the movement of the first user 314 into the room 302. The motion sensor 306 may include, but is not limited to, an infra-red (IR) transmitter-receiver to detect the movement of the first user 314. The motion sensor 306 may provide an electrical or digital pulse (or signal) to the circuitry 202 to indicate the movement of the first user 314 inside or outside the room 302. The circuitry 202 may be configured to count the number of electrical or digital pulses (or signals) received from the motion sensor 306 to count or determine the number of people inside the room 302. The number of pulses received from the motion sensor 306 may correspond the occupancy signal. Examples of the motion sensor 306 may include, but are not limited to, a passive infrared (PIR) sensor, an ultrasonic motion sensor, a microwave motion sensor, a tomographic motion sensor, or any other known motion sensor.

The image capture device 308 may include suitable logic, circuitry, and/or interfaces that may be configured to capture an image or a plurality of images of the room 302. The image capture device 308 may be further configured to detect the presence of the first user 314 inside the room 302 based on the captured image. The image capture device 308 may be further configured to determine the number of people present in the room 302 based on detection of images of multiple people in the captured image. In some embodiments, the image capture device 308 may provide the captured image, as the occupancy signal or data, to the circuitry 202. The circuitry 202 may detect the number of people captured in the received image based on different image processing techniques, such as, but not limited to face detection algorithms, object detection algorithms, deep learning algorithms, and other image processing algorithms. Examples of the image capture device 308 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. For example, in the scenario 300A in FIG. 3A, the circuitry 202 may determine the number of people present in the room 302 as one based on the image received from the image capture device 308.

The occupancy sensor 310 may include suitable logic, circuitry, and/or interfaces that may be configured to detect presence of the first user 314 who may have occupied the chair 316. The occupancy sensor 310 may be triggered to generate the occupancy signal, when the chair 316 is occupied by the first user 314. The occupancy sensor 310 may be further configured to generate occupancy signal based on, but is not limited to, presence of the first user 314, pressure exerted by the first user 314 on the chair 316, or body heat of the first user 314 The occupancy sensor 310 may be further configured to provide the generated occupancy signal to the circuitry 202 for the determination of the number of people present on the chair 316 or on any other type of seat (such as a couch which may include multiple people). Examples of the occupancy sensor 310 may include, but are not limited to, a pressure sensor, a load sensor, an infrared (IR) sensor, a heat sensor, a temperature sensor, or an ultrasonic sensor.

In accordance with an embodiment, the circuitry 202 may be configured to receive the occupancy signals from one of the motion sensor 306, the image capture device 308, or the occupancy sensor 310. The circuitry 202 may be further configured to determine number of people (such as the first user 314), present within the room 302, based on the occupancy signal received from at least one of the motion sensor 306, the image capture device 308, and/or the occupancy sensor 310. For example, with respect to the scenario 300A, the circuitry 202 may determine that one person (such as the first user 314) is present in the room 302 (i.e. enclosed physical space 108). The circuitry 202 may be configured to retrieve a first room-correction (RC) preset from the stored plurality of RC presets based on the determined number of people. Each of the plurality of RC presets may correspond to pre-calibrated information based on which the audio reproduction of the speaker 304 may be controlled. Each of the plurality of RC presets may be pre-calibrated or set for different positions of the room 302. For example, the first RC preset may be set for a position of the chair 316 in the room 302. Due to the control of the audio reproduction based on the first RC preset, the position of the chair 316 may be referred as a sweet spot. For example, during a calibration phase of the audio reproduction for the room 302, the microphone 312 may capture the audio reproduced by the speaker 304. The audio captured by the microphone 312 may be an audio signal which may have reached the microphone 312 directly or after certain reflections or absorption caused by walls or furniture (not shown) in the room 302. Therefore, a frequency response of the audio captured by the microphone 312 and a frequency response of the audio reproduced by the speaker 304 may be different which may not be desired by a listener (such as the first user 314). Thus, during the calibration phase, the microphone 312 may transmit the captured audio to the audio reproduction device 102 to further compare both the frequency responses. The audio reproduction device 102 may determine the first RC preset based on the comparison. The audio reproduction device 102 may control the speaker 304 to reproduce the audio based on the determined first RC preset which may be calculated for the position of the microphone 312 or the chair 316. Based on the first RC preset, the audio reproduction device 102 may equalize the frequency response, or control amplification/attenuation of certain frequencies of the sound reproduced by the speaker to perform the room correction based on the first RC present for the position of the microphone 312. The controlled audio reproduction based on the first RC preset may provide desired or optimal sound experience for a listener present at the position of the microphone 312 or the chair 316, therefore referred as the sweet spot. The audio reproduction device 102 may store the first RC preset defined during the calibration phase to achieve room correction for the position of the microphone 312 or the chair 316 (as the sweet spot) in real-time. In a similar manner, the disclosed audio reproduction device 102 may be configured to store the plurality of RC presets for different positions of the room 302.

In an embodiment, each of the plurality of RC presets may include information to control the audio reproduced of the speaker 304 to perform room correction for a particular location within the room 302. For example, each of the plurality of RC presets may include, but is not limited to information about an amplitude or a gain level of a particular frequency, information about amplification or attenuation corresponding to the particular frequency, information about a frequency range, a center frequency value, a quality factor (Q), bandwidth information, one or more filter coefficients, or delay information. For example, each of the plurality of RC presets may indicate a value of the amplitude or gain level (in dB) for the particular frequency (or for the filter 210) to perform audio equalization and the room correction. In another example, each of the plurality of RC presets may indicate the amplification or attenuation corresponding to the particular frequency in order to control the speaker 304 to provide desired sound output for a particular position (i.e. sweet spot) in the room 302. In another example, each of the plurality of RC presets may indicate the frequency range, or the bandwidth which has to be equalized to a particular amplitude/gain level. In another example, the each of the plurality of RC presets may indicate the delay information (in milliseconds or microseconds) which may indicate a time delay to be provided in the audio reproduction. In an embodiment, each of the pre-calibrated and stored plurality of RC preset values may be different from each other to perform room correction for different locations within the room 302. In another example, the plurality of RC presets may indicate one or more filter coefficients that may correspond to at least one of a finite impulse response (FIR) filter coefficients of the FIR filter 210A or an infinite impulse response (IIR) filter coefficients of the IIR filter 210B. The circuitry 202 may be further configured to store the plurality of RC presets in the memory 204 in form a look up table. Examples of the stored plurality of RC presets for different number of people, are presented in Table 1, as follows:

TABLE 1

Exemplary plurality of RC presets

| RC preset | Amplitude or gain level (in dB) | Frequency Range (in Hz or KHz) | Filter coefficients FIR | Filter coefficients IIR | Number of People in room |
|---|---|---|---|---|---|
| First RC preset | Gain level-1 | First Range | First Coefficients $b_0 \ldots b_n$ | First Coefficients $a_0 \ldots a_n$ | One |
| Second RC preset | Gain level-2 | Second Range | Second Coefficients $b_0 \ldots b_n$ | Second Coefficients $a_0 \ldots a_n$ | Two |
| Third RC preset | Gain level-3 | Third Range | Third Coefficients $b_0 \ldots b_n$ | Third Coefficients $a_0 \ldots a_n$ | Three |

It should be noted that data provided in Table 1 for the plurality of RC presets may merely be taken as exemplary data and may not be construed as limiting the present disclosure. In an example, the look-up table (Table 1) may store an association (or relationship) between the plurality of RC presets and different number of people.

In an embodiment, the circuitry 202 may be further configured to determine the number of people of the set of people (for example as one) based on the received occupancy signal received from the plurality of sensors 104. The circuitry 202 may retrieve the first RC preset from the stored plurality of RC presets based on the determined number of people as one. For example, based on the image (i.e. occupancy signal) received from the image capture device 308, the circuitry 202 may determine that only one person may be present on the chair 316 in the room 302. Based on the determination, the circuitry 202 may retrieve the stored or pre-calibrated first RC preset (i.e. for example values of gain, frequency, or coefficients from Table 1) to perform the room correction for the position of the chair 316 or for the one person (i.e. the first user 314) on the chair 316. The circuitry 202 may be further configured to control the audio reproduction of the speaker 304 based on the retrieved first RC preset. In other words, the circuitry 202 may apply the first RC preset on one or more filter functions (or the filter 210), associated with the speaker 304, to reproduce the audio with a defined response (for example a flat response or an ideal speaker response) to perform to the room correction for the position of the first user 314 on the chair 316. Based on the applied first RC preset, the speaker 304 may reproduce the audio output to compensate for the sound reflection or absorption caused by the walls or objects of the room 302 such that the frequency response of the audio captured by the microphone 312 may match with the frequency response of the audio reproduced by the speaker 304.

In an embodiment, the circuitry 202 may be further configured to receive a user input based on the determined number of people. The user input may correspond to a preference of the user (such as the first user 314). In an embodiment, the circuitry 202 may be configured to receive the user input in form of a touch user input, hand gestures, head gestures, a textual user input, an audio user input or a visual user input, via the I/O device 206. For example, the user input may be received from the first user 314 to confirm the number of people determined based on the received occupancy signal. In other example, the circuitry 202 may be configured to receive the user input as the number of people present in the room 302. In an example, the circuitry 202 may be configured to control the display device 208 to display a question to further receive the user input in the form of the textual user input, via the I/O device 206. In an exemplary implementation in FIG. 3A, the circuitry 202 may be configured to display the question on the display device 208 to select or provide the number or people. In some embodiments, the question may correspond to selection of room correction presets (for example "select the RC preset: one, two, three or four?"). In case, the user input is one, then the audio reproduction device 102 may select and retrieve the first RC preset, and further control the audio reproduction of the speaker 304 based on the selected first RC preset to perform the room correction for the first user 314 on the chair 316. In some embodiments, the selected first RC preset may correspond to a chair setting stored in the audio reproduction device 102. The chair setting may correspond to the room correction to be performed for the position of the chair 316 present in the room 302. In some embodiments, the user input may be selection of the chair setting of the audio reproduction device 102 to select the first RC preset and control the audio reproduction of the speaker 304 based on the selected first RC preset.

In an embodiment, after the control of the speaker 304 based on the stored first RC preset (for example in real-time), the circuitry 202 may be further configured to control the microphone 312 to capture the frequency response of the audio reproduced from the speaker 304. The audio (or the frequency response) captured by the microphone 312 may be provided to the audio reproduction device 102 to be compared with the audio reproduced based on the application of the first RC preset. The circuitry 202 may perform the comparison to check an accuracy of the room correction. For example, based on change in the room 302 (for example with change in certain objects within the room 302), the audio reflection or absorption may occur again in real-time after the calibration, due to which audio mismatch may occur between the reproduced audio and the captured audio. Thus, the circuitry 202 may compare the frequency responses and further configured to adjust (or refine) the first RC preset based on the comparison, such that the first user 314 may experience actual audio reproduced by the speaker 304. The circuitry 202 may further control the audio reproduction of the speaker 304 based on the adjusted first RC preset. The circuitry 202 may be further configured to re-store the adjusted first RC preset, corresponding to the position of the chair 316 and the determined number of people (as one), in the memory 204.

With reference to FIG. 3B, there is shown an exemplary scenario 300B. In the exemplary scenario 300, there is shown the room 302 which may include the motion sensor 306, the image capturing device 308 and the occupancy sensor 310 as the plurality of sensors 104 (as described, for example, in FIG. 3A). As shown in FIG. 3B, the room 302 may include a couch 320 (or a sofa) which may occupy multiple people. There may be further shown a first microphone 312A and a second microphone 312B with functionality similar to the microphone 312 (of FIG. 3A).

In FIG. 3B, there is further shown the first user 314 and a second user 318, who may be sitting on the couch 320 present in a proximity of the speaker 304 located within the room 302. In an embodiment, the first microphone 312A and the second microphone 312B may be positioned on the couch 320, such that the positions of the head of the first user 314 and the second user 318 may be substantially similar or close to the positions of the first microphone 312A and the second microphone 312B, respectively. Thus, the listening experience of the reproduced audio for users and microphones may be similar. In accordance with an embodiment, the circuitry 202 may be configured to receive the occupancy signal (either from the motion sensor 306, the image capture device 308, or the occupancy sensor 310) to determine the number of people present in the room 302. For example, the motion sensor 306 may count number of people entered the room, or image capture device 308 may capture the image of the multiple people (i.e. first user 314 and the second user 318) placed on the couch 320. The circuitry 202 may be configured to determine the number of people of the set of people as two based on the received occupancy signal (i.e. captured image from the image capture device 308, or signals received from the motion sensor 306, or pressure signal received from the occupancy sensor 310 located on the couch 320, as shown in FIG. 3B. In accordance with an embodiment, based on the determined number of people as two, the circuitry 202 may be configured to retrieve a second RC preset, different from the first RC preset, from the stored plurality of RC presets. For example, the second RC preset may be retrieved from the look-up table shown in Table 1 which may indicate the association between the plurality of RC presets and the number of people. The selected second RC preset may correspond to a couch setting of the audio reproduction device 102. In some embodiments, circuitry 202 may receive the user input from one of the first user 314 or the second user 318 to select the couch setting (or sofa setting), via the I/O device 206 of the audio reproduction device 102. Thereafter, the circuitry 202 may be configured to control the audio reproduction of the speaker 304 based on the retrieved second RC preset. The second RC preset may correspond to audio equalization information (for example amplitude/gain level, frequency range, bandwidth, Q factor, or delay, as described in FIG. 3A) to provide the room correction for the position of the couch 320 or the positions of the first microphone 312A and the second microphone 312B. Therefore, the disclosed audio reproduction device 102 may perform the room correction for the detection of two people (i.e. first user 314 and the second user 318) present on the couch 320 in the room 302. As described in FIG. 3B, the second RC preset stored in the memory 204, may be pre-calibrated to perform the room correction based on the frequency responses captured by the first microphone 312A and the second microphone 312B during the calibration phase of the room correction for two people positioned on the couch 320.

In an embodiment, to maintain the accuracy of the room correction (for example accuracy which may be affected due to a change in the room 302), the circuitry 202 may continuously verify (for example at a time interval of certain days or weeks) the frequency responses captured by the first microphone 312A and the second microphone 312B to maintain the accuracy. In such case, the circuitry 202 may be further configured to control the first microphone 312A and the second microphone 312B, located within the couch 320, to respectively capture frequency response of the audio reproduced from the speaker 304. The audio (or the frequency responses) captured by the first microphone 312A and the second microphone 312B may be provided to the audio reproduction device 102 to be respectively compared with the audio reproduced based on the application of the second RC preset. The circuitry 202 may perform the comparison to check an accuracy of the room correction for the positions of the first microphone 312A and the second microphone 312B (or for the position of the couch 320). In some embodiments, the circuitry 202 may calculate an average audio response of the frequency responses received from the first microphone 312A and the second microphone 312B and further compare the average audio response with the audio reproduced from the speaker 304. Thereafter, the circuitry 202 may be configured to adjust (or refine) the retrieved second RC preset based on the comparison to maintain the accuracy of the room correction for the people on the couch 320. The circuitry 202 may further control the audio reproduction of the speaker 304 based on the adjusted second RC preset. The circuitry 202 may be further configured to re-store the adjusted second RC preset, corresponding to the position of the couch 320 and the determined number of people (as two), in the memory 204.

In an embodiment, the circuitry 202 may be configured to determine the number of people of the set of people as three (not shown) based on the received occupancy signals received from the plurality of sensors 104. Based on the determined number of people as three, the circuitry 202 may be configured to retrieve a third RC preset (different from the first RC preset and the second RC preset), from the stored plurality of RC presets (for example as shown in Table 1). The circuitry 202 may be further configured to control the audio reproduction of the speaker 304 based on the retrieved third RC preset.

In an embodiment, the circuitry 202 may determine the number of people of the set of people as more than three based on the received occupancy signals received from the plurality of sensors 104. Based on the determined number of people as more than three, the circuitry 202 may be configured to retrieve another RC preset (i.e. defined for large groups) from the stored plurality of RC presets. Another RC preset for large groups may be referred as a fourth RC preset. The circuitry 202 may be further configured to control the audio reproduction of the speaker 304 based on the retrieved fourth RC preset to provide the room correction for large group of people (for example four or more people) in the room 302.

In an embodiment, the circuitry 202 may be configured to receive the user input, via the I/O device 206, to select or indicate one of a plurality of settings of the audio reproduction device 102. Each of the plurality of settings may be associated with a listening position in the enclosed physical space 108. The plurality of settings may include, but are not limited to, the chair setting associated for the chair 316 in FIG. 3A, the couch setting associated for the couch 320 in FIG. 3B, a sofa setting, or a setting associated with a particular position within the enclosed physical space 108. In an example, when the number of people present in the room 302 is one, the user may select the chair setting as described, for example, in FIG. 3A. The circuitry 202 may retrieve and apply the first RC preset on the speaker 304 for the selected chair setting as per the user input. In another example, when the number of people present within the room 302 is two, the user may select the couch setting such as described, for example, in FIG. 3B. In another example, when the number of people present within the room 302 is one, the user may select the couch setting, for example, in case the user may be located between the first microphone 312A and the second microphone 312B, considering the second RC preset may be calibrated based on the average frequency responses captured by the first microphone 312A and the second microphone 312B.

The circuitry 202 may be configured to select a particular RC preset (for example the first RC preset) from the stored plurality of RC presets based on the received user input on one of the plurality of settings. Based on the selected RC preset, the circuitry 202 may be further configured to control the audio reproduction of the speaker 304. In an example, in case the user input is to select the couch setting, the circuitry 202 may retrieve the second RC preset to perform the room correction for multiple people on the couch 320. In some embodiments, the circuitry 202 may confirm the number of people based on the occupancy signal, and accordingly select a particular RC setting based on the number of people and selected one of the plurality of settings of the audio reproduction device 102.

Figure 4:
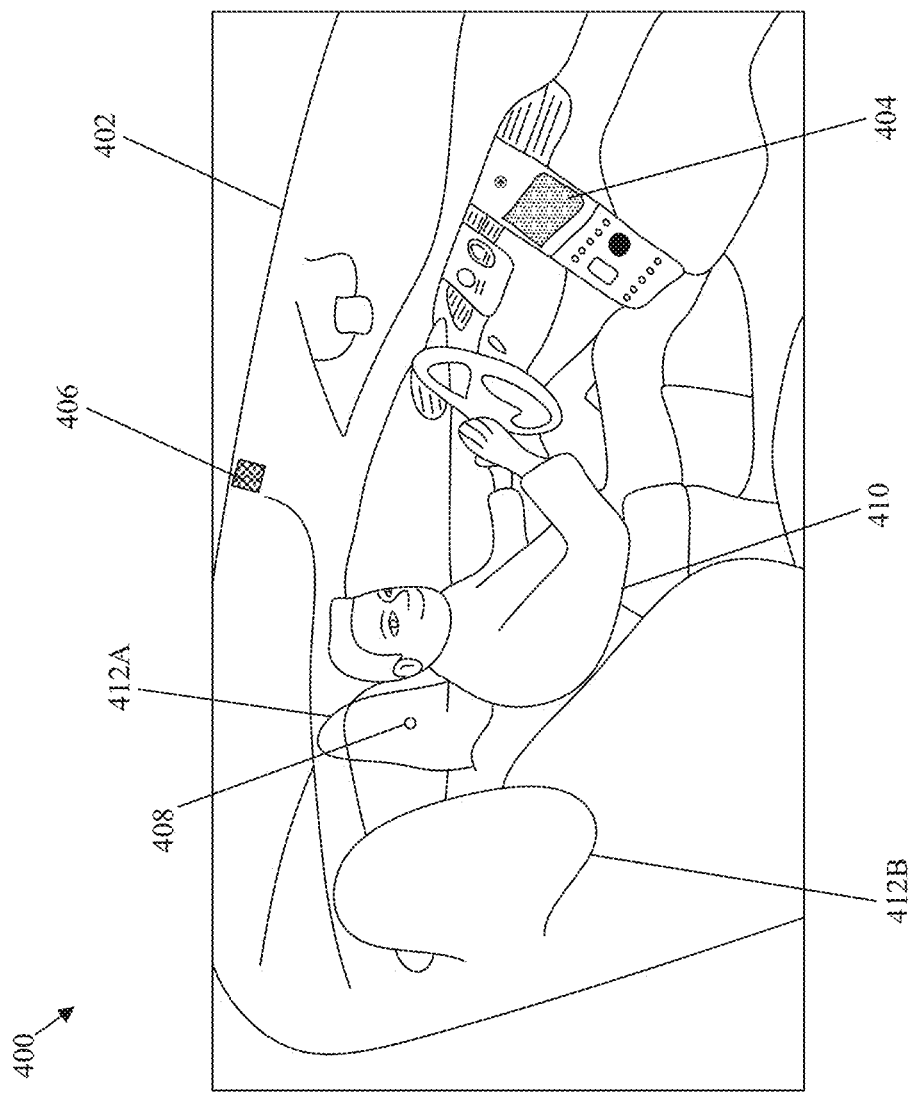
FIG. 4 is a diagram that illustrates another exemplary scenario for control of audio reproduction for room correction in automobile, in accordance with an embodiment of the disclosure.

FIG. 4 is a diagram that illustrates another exemplary scenario for control of audio reproduction for room correction in automobile, in accordance with an embodiment of the disclosure. FIG. 4 is explained in conjunction with elements from FIGS. 1, 2, 3A and 3B. With reference to FIG. 4, there is shown an exemplary scenario 400. In the exemplary scenario 400, there is shown an automobile 402 as an exemplary scenario of the enclosed physical space 108 of FIG. 1. There is further shown a speaker 404, which may be similar to the speaker 114 of FIG. 1. The speaker 404 may be included or associated with an audio reproduction device (similar to the audio reproduction device 102) integrated in the automobile 402. There is further shown a sensor 406 which may be similar to the image capture device 308 in the plurality of sensors 104, and further shown a microphone 408 which may be similar to the microphone 106. In FIG. 4, there is further shown a user 410 (for example an occupant) who may be sitting on a first seat 412A inside the automobile 402.

The circuitry (similar to the circuitry 202) of the audio reproduction device of the automobile 402 may be configured to receive the occupancy signal (for example a captured image) from the sensor 406. The sensor 406 may capture an image of an interior space of the automobile 402 based on a field of view (FOV) of the sensor 406. In some embodiments, the sensor 406 may be, but is not limited to, a heat sensor, a temperature sensor, or a motion sensor, without any deviation from the scope of the disclosure.

In accordance with an embodiment, based on the received occupancy signal from the sensor 406, the circuitry 202 may be further configured to determine the number of people (such as the user 410) present in the automobile 402. The circuitry 202 may be further configured to retrieve a first RC preset from a stored plurality of the RC presets (i.e. pre-calibrated for the automobile 402) based on the determined number of the people as one (for example, one person such as the user 410) in the automobile 402. Based on the retrieved first RC preset, the circuitry 202 may be further configured to control the audio reproduction of the speaker 404 to perform room correction in the automobile 402 for the position of the first seat 412A.

In an embodiment, the circuitry 202 may be further configured to control the microphone 408 to capture the frequency response of the audio reproduced from the speaker 404 and adjust (or refine) the retrieved first RC preset based on the captured frequency response to maintain the accuracy of the room correction performed in the automobile 402. The circuitry 202 may be further configured to control the audio reproduction of the speaker 404 based on the adjusted first RC preset and re-store the adjusted first RC preset, corresponding to the determined number of people, in the memory 204, as described, for example in FIGS. 3A and 3B.

In an embodiment, in case another user (or another occupant, not shown) may be sitting on a second seat 412B present in the automobile 402, the circuitry 202 may determine the number of people as two based on the received occupancy signal (or captured image) from the sensor 406. Based on the determined number of people as two, the circuitry may be configured to the retrieve a second RC preset, different from the first RC preset, from the stored plurality of RC presets, to further control the audio reproduction of the speaker 404 and perform room correction in the automobile 402 for the occupants.

Figure 5A:
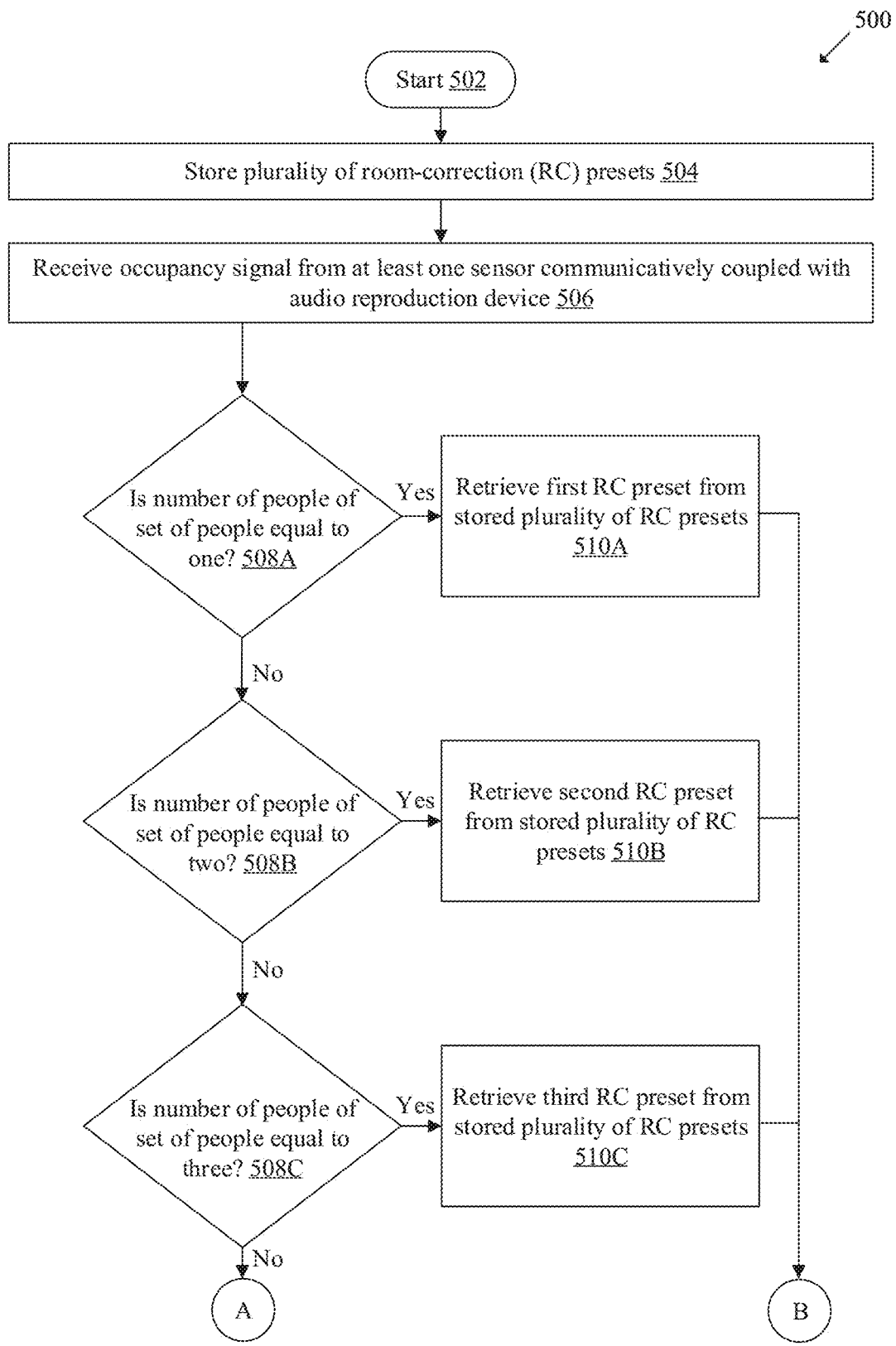
FIGS. 5A and 5B collectively depict a flowchart that illustrates an exemplary method for control of audio reproduction device for room correction based on occupancy determination, in accordance with an embodiment of the disclosure.
Figure 5B:
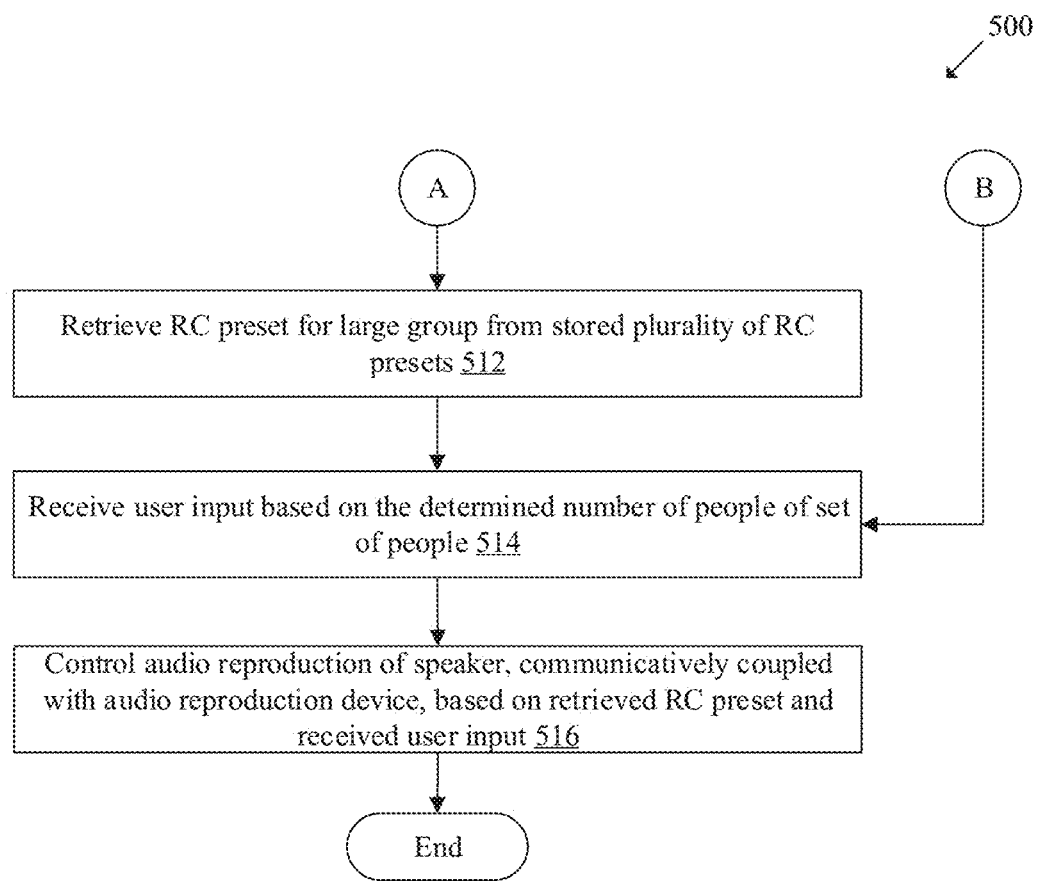

FIGS. 5A and 5B collectively depict a flowchart that illustrates an exemplary method for control of audio reproduction device for room correction based on occupancy determination, in accordance with an embodiment of the disclosure. FIGS. 5A and 5B are explained in conjunction with elements from FIGS. 1, 2, 3A, 3B, and 4. With reference to FIGS. 5A and 5B, there is shown a flowchart 500. The operations of the flowchart 500 may be executed by a computing system, such as the audio reproduction device 102, or the circuitry 202. The operations may start at 502 and proceed to 504.

At 504, the plurality of room correction (RC) presets may be stored. In one or more embodiments, the circuitry 202 may be configured to control the memory 204 to store the plurality of RC presets. The audio reproduction of the speaker 114 may be controlled within the enclosed physical space 108 based on each of the plurality of the RC presets. For example, each of the plurality of RC presets may include, but is not limited to, information about an amplitude or a gain level of a particular frequency, information about amplification or attenuation corresponding to the particular frequency, information about a frequency range, a center frequency value, a quality factor (Q), bandwidth information, one or more filter coefficients, or delay information. The plurality of RC presets may be pre-calibrated during a calibration phase of the room correction, as described for example, in FIGS. 3A and 3B.

At 506, the occupancy signal may be received from at least one sensor communicatively coupled with the audio reproduction device 102. In one or more embodiments, the circuitry 202 may be configured to receive the occupancy signal from at least one sensor of the plurality of sensors 104 communicatively coupled with the audio reproduction device 102. For example, the at least one sensor may include an Infra-red sensor, an image capturing device, a radio-frequency identification (RFID) sensor, a motion sensor, a proximity sensor, a temperature sensor, an occupancy sensor, an ultrasonic sensor, or a microwave sensor. The reception of the occupancy signal is described, for example, in FIGS. 3A and 3B.

At 508A, it may be determined whether the number of people of the set of people present in the enclosed physical space 108 is equal to one. In one or more embodiments, the circuitry 202 may be configured to check whether the number of people present in the enclosed physical space 108, is one or not, based on the occupancy signal received from the at least one sensor as described, for example, in FIG. 3A. In case of the determination, that the number of people is one, the control passes to step 510A, otherwise the control passes to step 508B.

At 508B, it may be determined whether the number of people of the set of people present in the enclosed physical space 108 is equal to two. In one or more embodiments, the circuitry 202 may be configured to check whether the number of people, present in the enclosed physical space 108, is two or not based on the occupancy signal received from the at least one sensor as described, for example, in FIG. 3B. In case of the determination, that the number of people is two, the control passes to step 510B, otherwise the control passes to step 508C.

At 508C, it may be determined whether the number of people of the set of the people present in the enclosed physical space 108 is equal to three. In one or more embodiments, the circuitry 202 may be configured to check whether the number of people, present in the enclosed physical space 108, is three or not based on the occupancy signal received from the at least one sensor. In case of the determination, that the number of people is three, the control passes to step 510C, otherwise the control passes to step 512.

At 510A, the first RC preset may be retrieved from the stored plurality of RC presets. In one or more embodiments, the circuitry 202 may be configured to retrieve the first RC preset from the stored plurality of presets based on the determined number of people as one, as described, for example, in FIG. 3A. Control passes to step 514.

At 510B, the second RC preset may be retrieved from the stored plurality of RC presets. In one or more embodiments, the circuitry 202 may be configured to retrieve the second RC preset, different from the first RC preset, from the stored plurality of presets based on the determined number of people as two, as described, for example, in FIG. 3A. Control passes to step 514.

At 510C, the third RC preset may be retrieved from the stored plurality of RC presets. In one or more embodiments, the circuitry 202 may be configured to retrieve the third RC preset, different from the first RC preset and the second RC preset, from the stored plurality of presets based on the determined number of people as three. Control passes to step 514.

At 512, the RC preset for a large group may be retrieved from the stored plurality of RC presets. In one or more embodiments, the circuitry 202 may be configured to retrieve the RC preset for the large group from the stored plurality of presets based on the determined number of people as more than three.

At 514, a user input may be received based on the determined number of people. In one or more embodiments, the circuitry 202 may be configured to receive the user input, via the I/O device 206, based on the determined number of people. The user input may be received for the confirmation of the determined number from the first user 116A. The circuitry 202 may be further configured to select the RC preset from the stored plurality of RC presets based on the received user input. In some embodiments, the user input may indicate the RC preset to be selected from the plurality of RC presets as per the preference of the user (such as the first user 116A).

At 516, the audio reproduction of the speaker 114 (i.e. communicably coupled with the audio reproduction device 102) may be controlled, based on the retrieved RC preset from the stored plurality of RC presets and the received user input. In one or more embodiments, the circuitry 202 may be configured to control the audio reproduction of the speaker 114 based on the retrieved RC preset and the received user input, as described, for example, in FIGS. 3A and 3B. Control may pass to end.

Although the flowchart 500 is illustrated as discrete operations, such as 504, 506, 508A-508C, 510A-510C, 512, 514 and 516, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example the reproduction device). The audio reproduction device may include a speaker that may be configured to reproduce an audio, and a memory that may be configured to store a plurality of room-correction (RC) presets, where audio reproduction of the speaker may be controlled within an enclosed physical space based on each of the plurality of RC presets. The instructions may cause the machine and/or computer (for example the audio reproduction device) to perform operations that include reception an occupancy signal from at least one sensor communicatively coupled with the audio reproduction device. The operations may further include determination of a number of people of a set of people, present in the enclosed physical space, based on the occupancy signal received from the at least one sensor. The operations may further include retrieval of a first room-correction (RC) preset from the stored plurality of RC presets based on the determined number of people. The operations may further include control of the audio reproduction of the speaker based on the retrieved first RC preset.

Exemplary aspects of the disclosure may include an audio reproduction device (such as, the audio reproduction device 102) that may include a speaker (such as, the speaker 114), a memory (such as, the memory 204) and a circuitry (such as, the circuitry 202) that may be communicatively coupled to the speaker and the memory. The memory may be configured to store a plurality of room-correction (RC) presets. For example, each of the plurality of RC presets may include at least one of information about an amplitude or a gain level of a particular frequency, information about amplification or attenuation corresponding to the particular frequency, information about a frequency range, a center frequency value, a quality factor (Q), bandwidth information, one or more filter coefficients, or delay information. The audio reproduction of the speaker may be controlled within an enclosed physical space (such as the enclosed physical space 108) based on each of the plurality of RC presets. The circuitry may be configured to receive an occupancy signal from at least one sensor (such as one of the plurality of sensors 104) communicatively coupled with the audio reproduction device. For example, the at least one sensor may include one of an Infra-red sensor, an image capturing device (such as the image capturing device 308), a radio-frequency identification (RFID) sensor, a motion sensor (such as, the motion sensor 306), a proximity sensor, a temperature sensor, an occupancy sensor (such as, the occupancy sensor 310), an ultrasonic sensor, or a microwave sensor. In an embodiment, the one or more filter coefficients correspond to at least one of a finite impulse response (FIR) filter coefficients or an infinite impulse response (IIR) filter coefficients. Based on the received occupancy signal, the circuitry may be configured to determine a number of people (such as the users 116A-116B) of a set of people, present in the enclosed physical space. The circuitry may be further configured to retrieve a first room-correction (RC) preset from the stored plurality of RC presets based on the determined number of people. The circuitry may be further configured to control the audio reproduction of the speaker based on the retrieved first RC preset.

In accordance with an embodiment, the circuitry may be further configured to receive a user input based on the determined number of people. Based on the received user input, the circuitry may be further configured to select the first RC preset from the stored plurality of RC presets. The circuitry may be further configured to control the audio reproduction of the speaker based on the selected first RC preset.

In accordance with an embodiment, the circuitry may be configured to receive a user input which may indicate one of a plurality of settings. Each of the plurality of settings may be associated with a listening position in the enclosed physical space. For example, the plurality of settings may include at least one of a chair setting, a couch setting, a sofa setting, or a setting associated with a position within the enclosed physical space. Based on the received user input, the circuitry may be further configured to select the first RC preset from the stored plurality of RC presets. The circuitry may be further configured to control the audio reproduction of the speaker based on the selected first RC preset.

In accordance with an embodiment, the circuitry may be further configured to determine the number of people of the set of people as one and retrieve the first RC preset from the stored plurality of RC presets based on the determined number of people as one. In accordance with an embodiment, the circuitry may be further configured to determine the number of people of the set of people as two. Based on the determined number of people as two, the circuitry may be further configured to retrieve a second RC preset, different from the first RC preset, from the stored plurality of RC presets. The circuitry may be further configured to control the audio reproduction of the speaker based on the retrieved second RC preset. In accordance with an embodiment, the circuitry may be further configured to determine the number of people of the set of people as three. Based on the determined number of people as three, the circuitry may be further configured to retrieve a third RC preset, different from the first RC preset, from the stored plurality of RC presets. The circuitry may be further configured to control the audio reproduction of the speaker based on the retrieved third RC preset.

In accordance with an embodiment, the circuitry may be further configured to control at least one microphone (such as the microphone 106), located within the enclosed physical space, to capture a frequency response of the audio reproduced from the speaker. Based on the captured frequency response, the circuitry may be configured to adjust the retrieved first RC preset. The circuitry may be further configured to control the audio reproduction of the speaker based on the adjusted first RC preset. In accordance with an embodiment, the circuitry may be further configured to re-store the adjusted first RC preset, corresponding to the determined number of people, in the memory.

In accordance with an embodiment, the circuitry may be further configured to apply the first RC preset on one or more filter functions, associated with the speaker, to reproduce the audio with a defined response. In accordance with an embodiment, the memory may be further configured to store an association between the plurality of RC presets and the number of people of the set of people. The circuitry may be further configured to retrieve the first RC preset based on the stored association. In accordance with an embodiment, the enclosed physical space may include an automobile.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An audio reproduction device, comprising:
   a speaker configured to reproduce an audio;
   a memory configured to store a plurality of room-correction (RC) presets, wherein
      the audio reproduction of the speaker is controlled within an enclosed physical space based on each of the plurality of RC presets, and
      each of the plurality of RC presets includes at least one of information about an amplitude or a gain level of a particular frequency, information about amplification or attenuation corresponding to the particular frequency, information about a frequency range, a center frequency value, a quality factor (Q), bandwidth information, at least one filter coefficient, or delay information; and
   circuitry coupled with the speaker and the memory, wherein the circuitry is configured to:
      receive an occupancy signal from at least one sensor communicatively coupled with the audio reproduction device;
      determine a count of people, present in the enclosed physical space, based on the occupancy signal received from the at least one sensor, wherein the memory is further configured to store an association between the plurality of RC presets and the count of people;
      retrieve a first room-correction (RC) preset from the stored plurality of RC presets based on the determined count of people and the stored association; and
      control the audio reproduction of the speaker based on the retrieved first RC preset.

2. The audio reproduction device according to claim 1, wherein the circuitry is further configured to:
   receive a user input based on the determined count of people;
   select the first RC preset from the stored plurality of RC presets based on the received user input; and
   control the audio reproduction of the speaker based on the selected first RC preset.

3. The audio reproduction device according to claim 1, wherein the circuitry is further configured to:
   receive a user input which indicates one of a plurality of settings, wherein each of the plurality of settings is associated with a listening position in the enclosed physical space;
   select the first RC preset from the stored plurality of RC presets based on the received user input; and
   control the audio reproduction of the speaker based on the selected first RC preset.

4. The audio reproduction device according to claim 3, wherein the plurality of settings comprise at least one of a chair setting, a couch setting, a sofa setting, or a setting associated with a position within the enclosed physical space.

5. The audio reproduction device according to claim 1, wherein the at least one filter coefficient corresponds to one of a finite impulse response (FIR) filter coefficient or an infinite impulse response (IIR) filter coefficient.

6. The audio reproduction device according to claim 1, wherein the circuitry is further configured to:
   determine the count of people as one; and
   retrieve the first RC preset from the stored plurality of RC presets based on the determined number count of people as one.

7. The audio reproduction device according to claim 1, wherein the circuitry is further configured to:
   determine the count of people as two;
   retrieve a second RC preset, different from the first RC preset, from the stored plurality of RC presets based on the determined count of people as two; and
   control the audio reproduction of the speaker based on the retrieved second RC preset.

8. The audio reproduction device according to claim 1, wherein the circuitry is further configured to:
   determine the count of people as three;
   retrieve a third RC preset, different from the first RC preset, from the stored plurality of RC presets based on the determined count of people as three; and
   control the audio reproduction of the speaker based on the retrieved third RC preset.

9. The audio reproduction device according to claim 1, wherein the at least one sensor comprises one of an Infra-red sensor, an image capturing device, a radio-frequency identification (RFID) sensor, a motion sensor, a proximity sensor, a temperature sensor, an occupancy sensor, an ultrasonic sensor, or a microwave sensor.

10. The audio reproduction device according to claim 1, wherein the circuitry is further configured to:
    control at least one microphone, located within the enclosed physical space, to capture a frequency response of the audio reproduced from the speaker;
    adjust the retrieved first RC preset based on the captured frequency response; and
    control the audio reproduction of the speaker based on the adjusted first RC preset.

11. The audio reproduction device according to claim 10, wherein the circuitry is further configured to re-store the adjusted first RC preset, corresponding to the determined count of people, in the memory.

12. The audio reproduction device according to claim 1, wherein the circuitry is further configured to apply the first RC preset on at least one filter function, associated with the speaker, to reproduce the audio with a defined response.

13. The audio reproduction device according to claim 1, wherein the enclosed physical space comprises an automobile.

14. A method, comprising:
    in an audio reproduction device that includes:
       a speaker configured to reproduce an audio; and
       a memory configured to store a plurality of room-correction (RC) presets, wherein the audio reproduction of the speaker is controlled within an enclosed physical space based on each of the plurality of RC presets, and each of the plurality of RC presets includes at least one of information about an amplitude or a gain level of a particular frequency, information about amplification or attenuation corresponding to the particular frequency, information about a frequency range, a center frequency value, a quality factor (Q), bandwidth information, at least one filter coefficient, or delay information;

receiving an occupancy signal from at least one sensor communicatively coupled with the audio reproduction device;

determining a count of people, present in the enclosed physical space, based on the occupancy signal received from the at least one sensor, wherein the memory is further configured to store an association between the plurality of RC presets and the count of people;

retrieving a first room-correction (RC) preset from the stored plurality of RC presets based on the determined count of people and the stored association; and controlling the audio reproduction of the speaker based on the retrieved first RC preset.

15. The method according to claim 14, further comprising:

receiving a user input based on the determined count of people;

selecting the first RC preset from the stored plurality of RC presets based on the received user input; and controlling the audio reproduction of the speaker based on the selected first RC preset.

16. The method according to claim 14, further comprising applying the first RC preset on at least one filter function, associated with the speaker, to reproduce the audio with a defined response.

17. A non-transitory computer-readable medium having stored thereon, computer-executable instructions that when executed by an audio reproduction device, causes the audio reproduction device to execute operations, the operations comprising:

receiving an occupancy signal from at least one sensor communicatively coupled with the audio reproduction device, wherein the audio reproduction device includes:

a speaker configured to reproduce an audio; and a memory configured to store a plurality of room-correction (RC) presets, the audio reproduction of the speaker is controlled within an enclosed physical space based on each of the plurality of RC presets, and each of the plurality of RC presets includes at least one of information about an amplitude or a gain level of a particular frequency, information about amplification or attenuation corresponding to the particular frequency, information about a frequency range, a center frequency value, a quality factor (Q), bandwidth information, at least one filter coefficient, or delay information;

determining a count of people, present in the enclosed physical space, based on the occupancy signal received from the at least one sensor, wherein the memory is further configured to store an association between the plurality of RC presets and the count of people;

retrieving a first room-correction (RC) preset from the stored plurality of RC presets based on the determined count of people and the stored association; and controlling the audio reproduction of the speaker based on the retrieved first RC preset.

* * * * *